(No Model.)

D. J. CHAMPION.
COPYING PAD HOLDER.

No. 369,691. Patented Sept. 13, 1887.

WITNESSES
N. S. Amstutz
W. E. Donnelly

David J. Champion INVENTOR
By
Leggett & Leggett
Attorneys

UNITED STATES PATENT OFFICE.

DAVID J. CHAMPION, OF CLEVELAND, OHIO.

COPYING-PAD HOLDER.

SPECIFICATION forming part of Letters Patent No. 369,691, dated September 13, 1887.

Application filed December 2, 1886. Serial No. 220,522. (No model.)

*To all whom it may concern:*

Be it known that I, DAVID J. CHAMPION, of Cleveland, in the county of Cuyahoga and State of Ohio, have invented certain new and useful Improvements in Copying-Pad Holders; and I do hereby declare the following to be a full, clear, and exact description of the invention, such as will enable others skilled in the art to which it pertains to make and use the same.

My invention relates to pad-holders for letter-copying presses; and it consists in the peculiar construction, hereinafter set forth, whereby the copying-pads are always kept in such condition that they are always ready for immediate use without the necessity of dampening them at each successive operation of copying.

Figure 1:
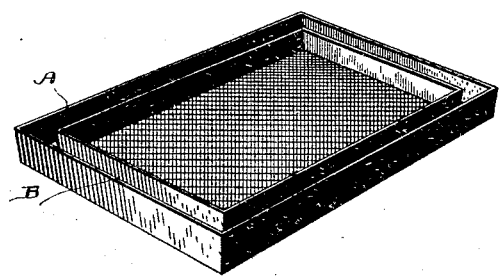
Figure 2:
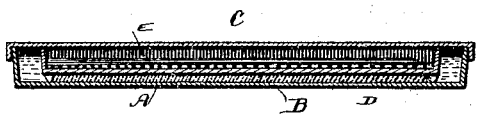

In the drawings, Figure 1 is a view in perspective of a pad-holder constructed according to my invention, showing the same with cover removed. Fig. 2 is a longitudinal vertical section taken through Fig. 1, showing more clearly the internal construction of the device and showing the cover in place.

A represents an outer vessel or container, of suitable material and shape, the material being water-tight, and the shape and dimensions depending on the size and number of pads to be used. Placed or secured in this outer container, A, is an inner container, B, which is constructed of porous material, preferably of unglazed tile, the material being such that while the free passage of water through it is prevented, still enough is allowed to percolate through to keep the pads placed therein in a moist condition without allowing them to become too damp or wet. This inner container, B, is formed so as to be smaller in dimensions than the outer container, A, so that when it is placed or secured therein there shall be a space surrounding it at its sides, ends, and bottom, the top or upper end being of course left open. The upper end of the inner container may be left flush with the upper end of the outer container, so that one cover will act to close both; but this may be left to the discretion of the person making the device, the principal thing being to close the inner container, B, air-tight, or practically so.

C represents a cover, which is so formed as to close the outer and inner containers, A B, practically air-tight; but it may be constructed so as to cover the inner container only, leaving the outer container open when so desired, the function of the cover C being to prevent the evaporation of the moisture from the inner container, B, and also when it covers both outer and inner containers to keep the contents clean from dust, &c.

D represents a piece of felt or equivalent material placed at the bottom of the container A and between it and the container B, its function being to absorb the water when it is low in the outer container, A, and by capillary attraction transmit the moisture to the porous container, and thence through it to its interior and to the pads.

If desired, (as in some cases it may be,) a perforated sheet, E, of rubber or like material may be used in the bottom of the inner container, B. This sheet of rubber is used when the intervals between the time one copying is done and the time the next takes place is longer than usual, when, as the pads are not in direct contact with the porous container, not so much moisture is absorbed by them, and they do not become too damp or wet.

The operation of my device is as follows: Water is placed in the outer container, A, care being taken that its height does not reach that of the upper end of the inner container, B. This water fills the space around and underneath the inner container, B, and percolates through it. The pads, after being first dampened to such an extent as to produce the best results in copying, are placed in the container B, and the cover C placed over all, thus excluding the air and confining the dampness. Thus confined, the pads are always in a uniform damp condition, and always ready for use.

What I claim is—

1. In a copying-pad container, the combination, with an outer container and an inner porous container, of an air-tight or practically air-tight cover, substantially as and for the purpose shown and described.

2. In a copying-pad container, the combination, with an outer water-container and an inner porous container, of an absorbent mateterial placed between the two, substantially as and for the purpose shown and described.

3. In a copying-pad container, the combination, with an outer water and an inner porous container, of the perforated sheet placed at the bottom of the inner container, substantially as and for the purpose shown and described.

In testimony whereof I sign this specification, in the presence of two witnesses, this 1st day of November, 1886.

DAVID J. CHAMPION.

Witnesses:
W. E. DONNELLY,
G. ENGEL.